US011937233B2

(12) United States Patent
Gao

(10) Patent No.: US 11,937,233 B2
(45) Date of Patent: Mar. 19, 2024

(54) UPLINK TRANSMISSION METHOD, DEVICE, TERMINAL AND NETWORK DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 578 days.

(21) Appl. No.: 17/261,160

(22) PCT Filed: Jul. 17, 2019

(86) PCT No.: PCT/CN2019/096307
§ 371 (c)(1),
(2) Date: Jan. 18, 2021

(87) PCT Pub. No.: WO2020/015667
PCT Pub. Date: Jan. 23, 2020

(65) Prior Publication Data
US 2021/0266936 A1 Aug. 26, 2021

(30) Foreign Application Priority Data
Jul. 18, 2018 (CN) .......................... 201810791165.3

(51) Int. Cl.
H04W 72/1268 (2023.01)
H04W 72/0446 (2023.01)
H04W 72/21 (2023.01)

(52) U.S. Cl.
CPC ... *H04W 72/1268* (2013.01); *H04W 72/0446* (2013.01); *H04W 72/21* (2023.01)

(58) Field of Classification Search
CPC ............ H04W 72/1268; H04W 72/21; H04W 72/0446
See application file for complete search history.

(56) References Cited

U.S. PATENT DOCUMENTS

2016/0381674 A1   12/2016  Kim et al.
2017/0207845 A1*   7/2017  Moon ................. H04B 7/0695
2019/0327759 A1   10/2019  Lee et al.

FOREIGN PATENT DOCUMENTS

CN    105850057 A    8/2016
WO    2018111948 A1  6/2018
WO    2018128501 A1  7/2018

OTHER PUBLICATIONS

International Preliminary Report on Patentability from PCT/CN2019/096307, dated Jan. 19, 2021, with English translation from WIPO.
(Continued)

*Primary Examiner* — Samina F Choudhry
(74) *Attorney, Agent, or Firm* — Ladas & Parry, LLP

(57) ABSTRACT

An uplink transmission method, an uplink transmission device, a terminal and a network device are provided. The method includes: determining one target uplink channel according to a preset rule under the condition that multiple uplink channels are overlapped in time domain; performing preset timeline judgement for the PUCCH within the multiple uplink channels and the target uplink channel; when the preset timeline is met, transmitting uplink control information, which is carried on the PUCCH within the multiple uplink channels, on the target uplink channel.

12 Claims, 5 Drawing Sheets

(56) References Cited

OTHER PUBLICATIONS

Written Opinion of the International Searching Authority from PCT/2019/096307, dated Oct. 15, 2019, with English translation from WIPO.
International Search Report from PCT/2019/096307, dated Oct. 15, 2019, with English translation from WIPO.
"Remaining Issues for multiplexing UCI on PUSCH", R1-1806133, 3GPP TSG RAN WG1 Meeting #93, Busan, Korea, May 21-25, 2018.
"PUSCH-PUCCH and PUCCH-PUCCH collision handling", R1-1806520, , 3GPP TSG RAN WG1 Meeting #93, Busan, Korea, May 21-25, 2018.
First Office Action and Search Report from CN app. No. 201810791165.3, dated Oct. 30, 2020, with English translation from Global Dossier.

* cited by examiner

UPLINK TRANSMISSION METHOD, DEVICE, TERMINAL AND NETWORK DEVICE

CROSS-REFERENCE TO RELATED APPLICATIONS

This application is the U.S. national phase of PCT Application PCT/CN2019/096307 filed on Jul. 17, 2019, which claims priority to Chinese Patent Application No. 201810791165.3 filed on Jul. 18, 2018 in China, the entire contents of which are incorporated herein by reference in their entireties.

TECHNICAL FIELD

The disclosure relates to the technical field of communications technology, in particular to an uplink transmission method, device, terminal and network device.

BACKGROUND

With the development and change of mobile communication service demand, several organizations such as the international telecommunication union (ITU) began to study new wireless communication systems (i.e., 5th generation new radio (5G NR)) for future mobile communication systems. In the 5G NR, simultaneous transmission of a physical uplink control channel (PUCCH) and a physical uplink shared channel (PUSCH) is not supported, and parallel transmission of multiple PUCCHs in the same PUCCH group is not supported.

For overlapping of one PUCCH and one PUSCH, as shown in FIG. 1 and FIG. 2, in order to determine whether uplink control information (UCI) on the PUCCH can be transferred to the PUSCH, it is necessary to judge whether an initial earliest channel (hereinafter referred to as a target channel A) among overlapped channels meets the following timeline; for overlapping of one PUCCH and another PUCCH, as shown in FIG. 3 and FIG. 4, in order to determine whether UCIs on multiple overlapped PUCCHs can be combined for transmitting in one PUCCH, it is necessary to determine whether an initial earliest channel (hereinafter referred to as the target channel A) among overlapped channels meets the following timeline. When the timeline is met, for overlapping between PUCCH and PUSCH, UCI on the PUCCH can be transferred to the PUSCH for transmission, so that the PUCCH will not be transmitted any more; for overlapping between PUCCHs, UCIs can be combined to be transmitted in one PUCCH, and a PUCCH resource finally used for transmitting the combined UCIs is not necessarily one of originally overlapped PUCCH resources and may be a newly determined PUCCH resource with larger bearing capacity. When the following timeline is not met, it is considered as an erroneous scheduling of a base station, which is not expected by a terminal. The timeline is defined as follows:

Timeline 1: a first symbol of the target channel A is not earlier than N1+X symbols after a last symbol of a physical downlink shared channel (PDSCH), and an interval between the first symbol of the target channel A and the last symbol of the PDSCH is not less than N1+X symbols;

Timeline 2: a first symbol of the target channel A is not earlier than N2+Y symbols after a last symbol of PDCCH that schedules PDSCH or PUSCH, and an interval between the first symbol of the target channel A and the last symbol of the PDCCH that schedules PDSCH or PUSCH is not less than N2+Y symbols.

N1 is a preset processing delay of PDSCH, N2 is a preset processing delay of PUSCH, and X and Y are preset additional processing delays for performing UCI combination or transfer.

In summary, on the one hand, simultaneous transmission of PUCCH and PUSCH is not supported in the 5G NR system, in this case, it needs to judge whether an initial earliest channel in PUCCH and PUSCH meets a predefined timeline or not. When the initial earliest channel meets the timeline, UCI carried on the PUCCH is transferred to the PUSCH for transmission, and the PUCCH is not transmitted any more consequently; otherwise, it is considered as a scheduling error. In carrier aggregation scenarios, PUSCH may exist on multiple carriers at the same time, then multiple PUSCHs and PUCCHs may overlap in time domain. At this point, it needs to select one PUSCH from the multiple PUSCHs for transmitting UCI. In the related art, there is no definite method about how to use the predefined timeline when selecting PUSCH.

On the other hand, in the 5G NR system, only one PUCCH can be transmitted at the same time on a carrier carrying PUCCH, but PUCCHs carrying different types of UCI may overlap in the time domain. In this case, it also needs to judge whether an initial earliest channel in overlapped PUCCHs meets a predefined timeline or not; when the timeline is met, UCIs on multiple PUCCHs can be combined for transmission on one PUCCH channel; otherwise, it is considered as a scheduling error. When multiple PUCCHs are overlapped, there is no definite method about how to use the predefined timeline when performing UCI combination for transmission.

SUMMARY

The disclosure aims to provide an uplink transmission method and device, a terminal, and network device, so as to solve the problem that there is no available method in the related art about how to perform preset timeline judgement when multiple uplink channels are overlapped in time domain.

In order to solve the above problems, one embodiment of the present disclosure provides an uplink transmission method, applied to a terminal and including:

determining one target uplink channel according to a preset rule under the condition that multiple uplink channels are overlapped in time domain; wherein the multiple uplink channels include at least one physical uplink control channel (PUCCH);

performing preset timeline judgement for the PUCCH within the multiple uplink channels and the target uplink channel;

when the preset timeline is met, transmitting uplink control information, which is carried on the PUCCH within the multiple uplink channels, on the target uplink channel.

The method further includes: when the preset timeline is not met, determining that overlapping of the multiple uplink channels in the time domain is an erroneous scheduling or configuration.

Further, under the condition that the multiple uplink channels include one PUCCH and multiple physical uplink control channels (PUSCHs), the determining one target uplink channel according to a preset rule, includes: selecting one PUSCH from the multiple PUSCHs according to a PUSCH selection rule;

the performing preset timeline judgement for the PUCCH within the multiple uplink channels and the target uplink channel, includes: performing preset timeline judgment on the selected one PUSCH and the PUCCH;

when the preset timeline is met, transmitting uplink control information, which is carried on the PUCCH within the multiple uplink channels, on the target uplink channel, includes: under the condition that the preset timeline is met, transmitting the uplink control information, which is carried on the PUCCH, on the selected PUSCH.

Further, under the condition that the multiple uplink channels include multiple PUCCHs, the determining one target uplink channel according to a preset rule, includes: according to an uplink control information combination transmission rule, determining one PUCCH, which is able to carry uplink control information on the multiple PUCCHs; wherein the determined one PUCCH is one PUCCH of the multiple PUCCHs, or one PUCCH different from the multiple PUCCHs;

the performing preset timeline judgement for the PUCCH within the multiple uplink channels and the target uplink channel, includes: performing preset timeline judgement for the determined one PUCCH and the multiple PUCCHs;

when the preset timeline is met, transmitting uplink control information, which is carried on the PUCCH within the multiple uplink channels, on the target uplink channel, includes: under the condition that the preset timeline is met, transmitting uplink control information, which is carried on the multiple PUCCHs, on the determined one PUCCH.

Further, the performing preset timeline judgement for the PUCCH within the multiple uplink channels and the target uplink channel, includes:

performing the following judgement for a channel with an earliest transmission time from the PUCCH within the multiple uplink channels and the target uplink channel:

a first symbol of the channel with the earliest transmission time is not earlier than N1+X symbols after a last symbol of a physical downlink shared channel (PDSCH) corresponding to the PUCCH within the multiple uplink channels; and the first symbol of the channel with the earliest transmission time is not earlier than N2+Y symbols after a last symbol of a physical downlink control channel (PDCCH) corresponding to the target uplink channel;

wherein N1 is a preset processing delay of PDSCH, N2 is a preset processing delay of PUSCH, and X and Y are preset additional processing delays.

One embodiment of the present disclosure further provides an uplink transmission method, applied to a network device and including:

determining one target uplink channel according to a preset rule under the condition that multiple uplink channels are overlapped in time domain; wherein the multiple uplink channels include at least one physical uplink control channel (PUCCH);

performing preset timeline judgement for the PUCCH within the multiple uplink channels and the target uplink channel;

when the preset timeline is met, receiving uplink control information, which is carried on the PUCCH within the multiple uplink channels, on the target uplink channel.

Further, the method further includes: when the preset timeline is not met, determining that overlapping of multiple uplink channels in the time domain is an erroneous scheduling or configuration.

Further, under the condition that multiple uplink channels include one PUCCH and multiple physical uplink control channels (PUSCHs), the determining one target uplink channel according to a preset rule, includes: selecting one PUSCH from the multiple PUSCHs channel according to a PUSCH selection rule;

the performing preset timeline judgement for the PUCCH within the multiple uplink channels and the target uplink channel, includes: performing preset timeline judgment on the selected one PUSCH and the PUCCH;

when the preset timeline is met, receiving uplink control information, which is carried on the PUCCH within the multiple uplink channels, on the target uplink channel, includes: under the condition that the preset timeline is met, receiving the uplink control information, which is carried on the PUCCH, on the selected one PUSCH.

Further, under the condition that the multiple uplink channels include multiple PUCCHs, the determining one target uplink channel according to a preset rule, includes: according to an uplink control information combination transmission rule, determining one PUCCH, which is able to carry uplink control information on the multiple PUCCHs; wherein the determined one PUCCH is one PUCCH of the multiple PUCCHs, or one PUCCH different from the multiple PUCCHs;

the performing preset timeline judgement for the PUCCH within the multiple uplink channels and the target uplink channel, includes: performing preset timeline judgement for the determined one PUCCH and the multiple PUCCHs;

when the preset timeline is met, receiving uplink control information, which is carried on the PUCCH within the multiple uplink channels, on the target uplink channel, includes: under the condition that the preset timeline is met, receiving uplink control information, which is carried on the multiple PUCCHs, on the determined one PUCCH.

Further, the performing preset timeline judgement for the PUCCH within the multiple uplink channels and the target uplink channel, includes:

performing the following judgement for a channel with an earliest transmission time from the PUCCH within the multiple uplink channels and the target uplink channel:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays.

One embodiment of the present disclosure further provides an uplink transmission method, applied to a terminal and including:

a first determination module configured for determining one target uplink channel according to a preset rule under the condition that multiple uplink channels are overlapped in time domain; wherein the multiple uplink channels include at least one physical uplink control channel (PUCCH);
a first judging module configured for performing preset timeline judgement for the PUCCH within the multiple uplink channels and the target uplink channel;
a transmission module configured for, when the preset timeline is met, transmitting uplink control information, which is carried on the PUCCH within the multiple uplink channels, on the target uplink channel.

Further, under the condition that the multiple uplink channels include one PUCCH and multiple physical uplink control channels (PUSCHs),
the first determination module is configured for selecting one PUSCH from the multiple PUSCHs according to a PUSCH selection rule;
the first judging module is configured for performing preset timeline judgment on the selected one PUSCH and the PUCCH;
the transmission module is configured for, under the condition that the preset timeline is met, transmitting the uplink control information, which is carried on the PUCCH, on the selected PUSCH.

Further, under the condition that the multiple uplink channels include multiple PUCCHs,
the first determination module is configured for, according to an uplink control information combination transmission rule, determining one PUCCH, which is able to carry uplink control information on the multiple PUCCHs; wherein the determined one PUCCH is one PUCCH of the multiple PUCCHs, or one PUCCH different from the multiple PUCCHs;
the first judging module is configured for performing preset timeline judgement for the determined one PUCCH and the multiple PUCCHs;
the transmission module is configured for, under the condition that the preset timeline is met, transmitting uplink control information, which is carried on the multiple PUCCHs, on the determined one PUCCH.

Further, the first judging module is further configured for:
performing the following judgement for a channel with an earliest transmission time from the PUCCH within the multiple uplink channels and the target uplink channel:
a first symbol of the channel with the earliest transmission time is not earlier than N1+X symbols after a last symbol of a physical downlink shared channel (PDSCH) corresponding to the PUCCH within the multiple uplink channels; and
the first symbol of the channel with the earliest transmission time is not earlier than N2+Y symbols after a last symbol of a physical downlink control channel (PDCCH) corresponding to the target uplink channel;
wherein N1 is a preset processing delay of PDSCH, N2 is a preset processing delay of PUSCH, and X and Y are preset additional processing delays.

One embodiment of the present disclosure further provides a terminal and including: a transceiver, a memory, a processor and computer programs stored on the memory and operable on the processor;
wherein the processor is configured for reading the programs in the memory and implementing the following processes:
determining one target uplink channel according to a preset rule under the condition that multiple uplink channels are overlapped in time domain; wherein the multiple uplink channels include at least one physical uplink control channel (PUCCH);
performing preset timeline judgement for the PUCCH within the multiple uplink channels and the target uplink channel;
the transceiver is configured for, when the preset timeline is met, transmitting uplink control information, which is carried on the PUCCH within the multiple uplink channels, on the target uplink channel.

Further, the processor is further configured for: when the preset timeline is not met, determining that overlapping of the multiple uplink channels in the time domain is an erroneous scheduling or configuration.

Further, under the condition that the multiple uplink channels include one PUCCH and multiple physical uplink control channels (PUSCHs), the processor is further configured for:
selecting one PUSCH from the multiple PUSCHs according to a PUSCH selection rule;
performing preset timeline judgment on the selected one PUSCH and the PUCCH;
wherein the transceiver is further configured for, under the condition that the preset timeline is met, transmitting the uplink control information, which is carried on the PUCCH, on the selected PUSCH.

Further, under the condition that the multiple uplink channels include multiple PUCCHs, the processor is further configured for:
according to an uplink control information combination transmission rule, determining one PUCCH, which is able to carry uplink control information on the multiple PUCCHs; wherein the determined one PUCCH is one PUCCH of the multiple PUCCHs, or one PUCCH different from the multiple PUCCHs;
performing preset timeline judgement for the determined one PUCCH and the multiple PUCCHs;
wherein the transceiver is further configured for:
under the condition that the preset timeline is met, transmitting uplink control information, which is carried on the multiple PUCCHs, on the determined one PUCCH.

Further, the processor is further configured for:
performing the following judgement for a channel with an earliest transmission time from the PUCCH within the multiple uplink channels and the target uplink channel:
a first symbol of the channel with the earliest transmission time is not earlier than N1+X symbols after a last symbol of a physical downlink shared channel (PDSCH) corresponding to the PUCCH within the multiple uplink channels; and
the first symbol of the channel with the earliest transmission time is not earlier than N2+Y symbols after a last symbol of a physical downlink control channel (PDCCH) corresponding to the target uplink channel;
wherein N1 is a preset processing delay of PDSCH, N2 is a preset processing delay of PUSCH, and X and Y are preset additional processing delays.

One embodiment of the present disclosure further provides a computer readable storage medium including computer programs stored thereon; wherein the computer programs are executed by a processor to cause the processor to implement steps of the above uplink transmission method.

One embodiment of the present disclosure further provides an uplink transmission device, applied to a network device, including:
a second determination module configured for determining one target uplink channel according to a preset rule under the condition that multiple uplink channels are overlapped in time domain; wherein the multiple uplink channels include at least one physical uplink control channel (PUCCH);

a second judging module configured for performing preset timeline judgement for the PUCCH within the multiple uplink channels and the target uplink channel;

a receiving module configured for, when the preset timeline is met, receiving uplink control information, which is carried on the PUCCH within the multiple uplink channels, on the target uplink channel.

Further, under the condition that multiple uplink channels include one PUCCH and multiple physical uplink control channels (PUSCHs), the second determination module is configured for selecting one PUSCH from the multiple PUSCHs channel according to a PUSCH selection rule;

the second judging module is configured for performing preset timeline judgment on the selected one PUSCH and the PUCCH;

the receiving module is configured for, under the condition that the preset timeline is met, receiving the uplink control information, which is carried on the PUCCH, on the selected one PUSCH.

Further, under the condition that the multiple uplink channels include multiple PUCCHs, the second determination module is configured for, according to an uplink control information combination transmission rule, determining one PUCCH, which is able to carry uplink control information on the multiple PUCCHs; wherein the determined one PUCCH is one PUCCH of the multiple PUCCHs, or one PUCCH different from the multiple PUCCHs;

the second judging module is configured for performing preset timeline judgement for the determined one PUCCH and the multiple PUCCHs;

the receiving module is configured for, under the condition that the preset timeline is met, receiving uplink control information, which is carried on the multiple PUCCHs, on the determined one PUCCH.

Further, the second judging module is further configured for:

performing the following judgement for a channel with an earliest transmission time from the PUCCH within the multiple uplink channels and the target uplink channel:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays.

One embodiment of the present disclosure further provides a network device, including: a transceiver, a memory, a processor and computer programs stored on the memory and operable on the processor;

wherein the processor is configured for reading the programs in the memory and implementing the following processes:

determining one target uplink channel according to a preset rule under the condition that multiple uplink channels are overlapped in time domain; wherein the multiple uplink channels include at least one physical uplink control channel (PUCCH);

performing preset timeline judgement for the PUCCH within the multiple uplink channels and the target uplink channel;

wherein the transceiver is configured for, when the preset timeline is met, receiving uplink control information, which is carried on the PUCCH within the multiple uplink channels, on the target uplink channel.

Further, the processor is further configured for: when the preset timeline is not met, determining that overlapping of multiple uplink channels in the time domain is an erroneous scheduling or configuration.

Further, under the condition that multiple uplink channels include one PUCCH and multiple physical uplink control channels (PUSCHs), the processor is further configured for:

selecting one PUSCH from the multiple PUSCHs channel according to a PUSCH selection rule;

performing preset timeline judgment on the selected one PUSCH and the PUCCH;

wherein the transceiver is configured for, under the condition that the preset timeline is met, receiving the uplink control information, which is carried on the PUCCH, on the selected one PUSCH.

Further, under the condition that the multiple uplink channels include multiple PUCCHs, the processor is further configured for:

according to an uplink control information combination transmission rule, determining one PUCCH, which is able to carry uplink control information on the multiple PUCCHs; wherein the determined one PUCCH is one PUCCH of the multiple PUCCHs, or one PUCCH different from the multiple PUCCHs;

performing preset timeline judgement for the determined one PUCCH and the multiple PUCCHs;

wherein the transceiver is configured for, under the condition that the preset timeline is met, receiving uplink control information, which is carried on the multiple PUCCHs, on the determined one PUCCH.

Further, the processor is further configured for:

performing the following judgement for a channel with an earliest transmission time from the PUCCH within the multiple uplink channels and the target uplink channel:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays.

One embodiment of the present disclosure further provides a computer readable storage medium including computer programs stored thereon; wherein the computer programs are executed by a processor to cause the processor to implement steps of the above uplink transmission method.

The above technical solutions of the present disclosure have at least the following beneficial effects:

In the uplink transmission method, the plink transmission device, the terminal and the network device of the embodiments of the present disclosure, when multiple uplink channels are overlapped in the time domain, first determining the target uplink channel by using the preset rule, then performing preset timeline judgement for the determined target uplink channel and PUCCH within the multiple uplink channels, and performing corresponding uplink transmission according to a judgment result, only one timeline judgment needs to be performed on an uplink channel group composed of the target uplink channel and the PUCCH within the multiple uplink channels, which can avoid complicated steps of performing one timeline judgment on every two overlapped channels, thereby improving processing efficiency. Meanwhile, it is also possible to avoid erroneous transmission behaviors of the terminal caused by that the timeline is not met by some channels which are not selected for transmitting the uplink control information (UCI), when performing timeline judgment on every two overlapped channels.

DETAILED DESCRIPTION

To make the technical problems, technical solutions, and advantages of this disclosure clearer, detailed description is described hereinafter with reference to the accompanying drawings and embodiments.

Figure 1:
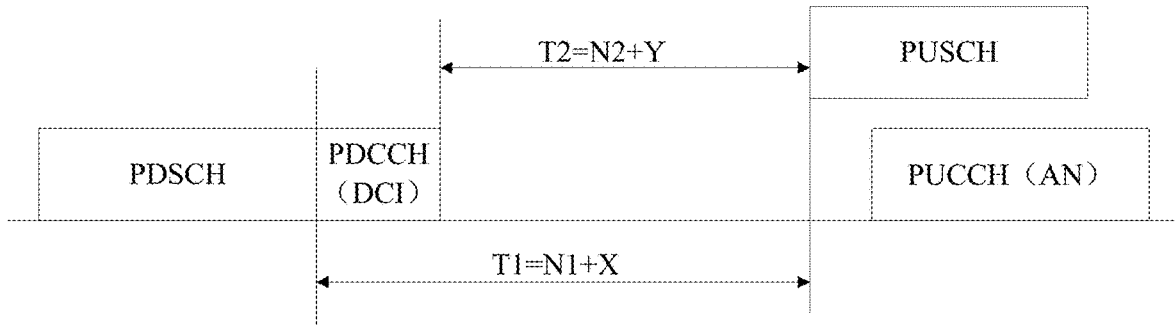
FIG. 1 shows a first diagram of timeline judgment under the condition of a PUCCH overlapping with a PUSCH in the related art.
Figure 2:
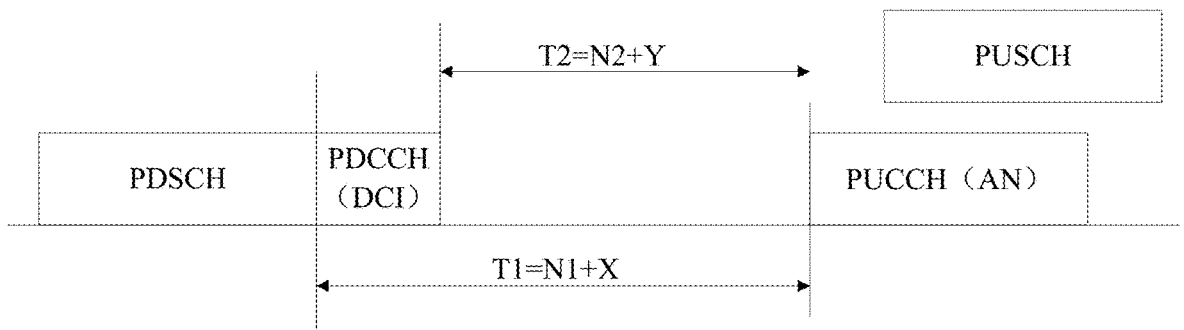
FIG. 2 shows a second diagram of timeline judgment under the condition of a PUCCH overlapping with a PUSCH in the related art.
Figure 3:
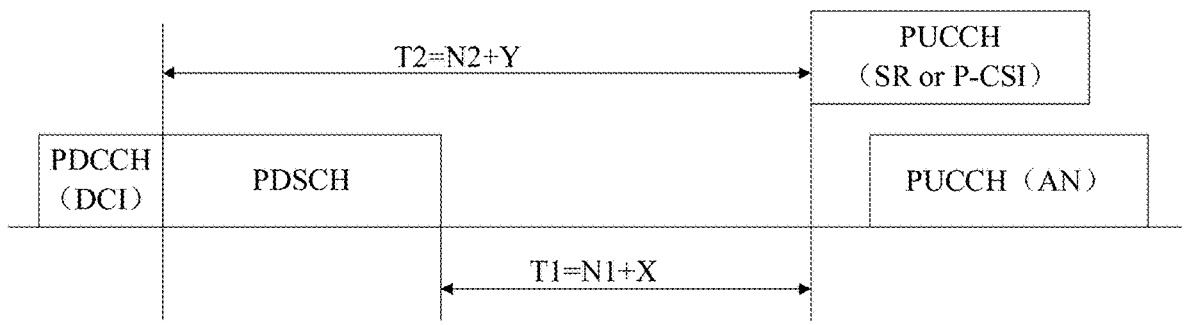
FIG. 3 shows a first diagram of timeline judgment under the condition of a PUCCH overlapping with another PUCCH in the related art.
Figure 4:
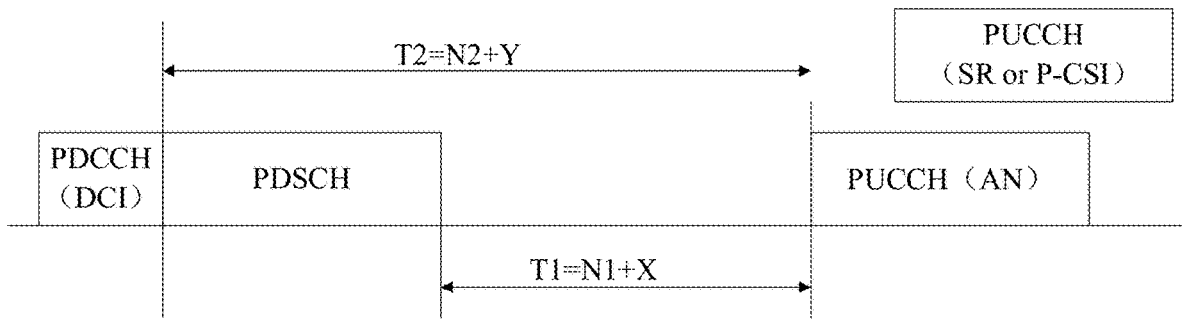
FIG. 4 shows a second diagram of timeline judgment under the condition of a PUCCH overlapping with another PUCCH in the related art.
Figure 5:
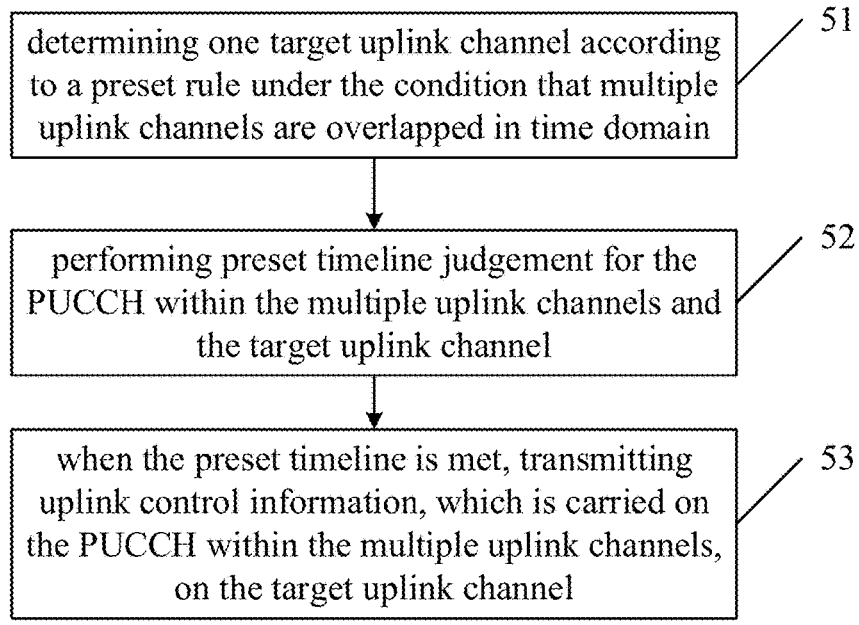
FIG. 5 shows a first flow chart of an uplink transmission method provided in an embodiment of the present disclosure.

As shown in FIG. 5, one embodiment of the disclosure provides an uplink transmission method applied to a terminal, including:

Step 51: determining one target uplink channel according to a preset rule under the condition that multiple uplink channels are overlapped in time domain; where the multiple uplink channels include at least one physical uplink control channel (PUCCH);

Step 52: performing preset timeline judgement for the PUCCH within the multiple uplink channels and the target uplink channel;

Step 53: when the preset timeline is met, transmitting uplink control information, which is carried on the PUCCH within the multiple uplink channels, on the target uplink channel.

Furthermore, in the above embodiments of the disclosure, the method further includes:

when the preset timeline is not met, determining that overlapping of multiple uplink channels in the time domain is an erroneous scheduling or configuration. That is, if no specific transmission behavior is specified at this time, it will lead to inconsistent understanding of the transmission channels between the terminal and a base station. Thus, in order to avoid such scheduling error, when scheduling, the base station needs to confirm that the timeline is met between the scheduled overlapping channels.

It should be noted that in the above embodiments of the disclosure, the overlapping of multiple uplink channels in the time domain at least include the following two scenarios:

scenario one: PUCCH overlaps with multiple PUSCHs in the time domain;

scenario two: multiple PUCCHs overlapped in the time domain.

On the one hand, for the scenario one, under the condition that multiple uplink channels overlapped in the time domain include one PUCCH and multiple physical uplink control channels (PUSCHs), the step 51 includes:

selecting one PUSCH from the multiple PUSCHs as the target uplink channel according to a PUSCH selection rule; where the PUSCH selection rule is the same as the PUSCH selection rule in the related art and will not be described here.

Correspondingly, the step 52 includes:

performing preset timeline judgment on the selected PUSCH and the PUCCH.

In one embodiment, performing preset timeline judgment on the selected PUSCH and the PUCCH includes:

performing following judgement for a channel with an earliest transmission time from the selected PUSCH and the PUCCH:

a first symbol of the channel with the earliest transmission time is not earlier than N1+X symbols after a last symbol of a physical downlink shared channel (PDSCH) corresponding to the PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays; for example, the additional processing delays at least include a processing delay required for performing uplink control information combination or transfer.

The physical downlink shared channel (PDSCH) corresponding to the PUCCH within the multiple uplink channels is specifically a PDSCH that requires hybrid automatic repeat request-acknowledge (HARQ-ACK) feedback on the PUCCH within the multiple uplink channels.

The physical downlink control channel (PDCCH) corresponding to the target uplink channel is specifically as follows. If the target uplink channel is PUCCH, the PDCCH corresponding to the target uplink channel is, a PDCCH used for scheduling PDSCH that requires HARQ-ACK feedback on the PUCCH within the multiple uplink channels, or a PDCCH that requires HARQ-ACK feedback on the PUCCH within the multiple uplink channels and indicates downlink semi-persistent scheduling (SPS) resource release. If the target uplink channel is PUSCH, the PDCCH corresponding to the target uplink channel is a PDCCH used for scheduling the PUSCH (i.e., a PDCCH carrying UL grant).

Accordingly, the step 53 includes:

under the condition that the preset timeline is met, transmitting the uplink control information, which is carried on the PUCCH, on the selected PUSCH. That is, the uplink control information (UCI) originally required to be carried on the PUCCH, is transferred to the selected PUSCH for transmission without transmitting the corresponding PUCCH.

Embodiment One

Figure 6:
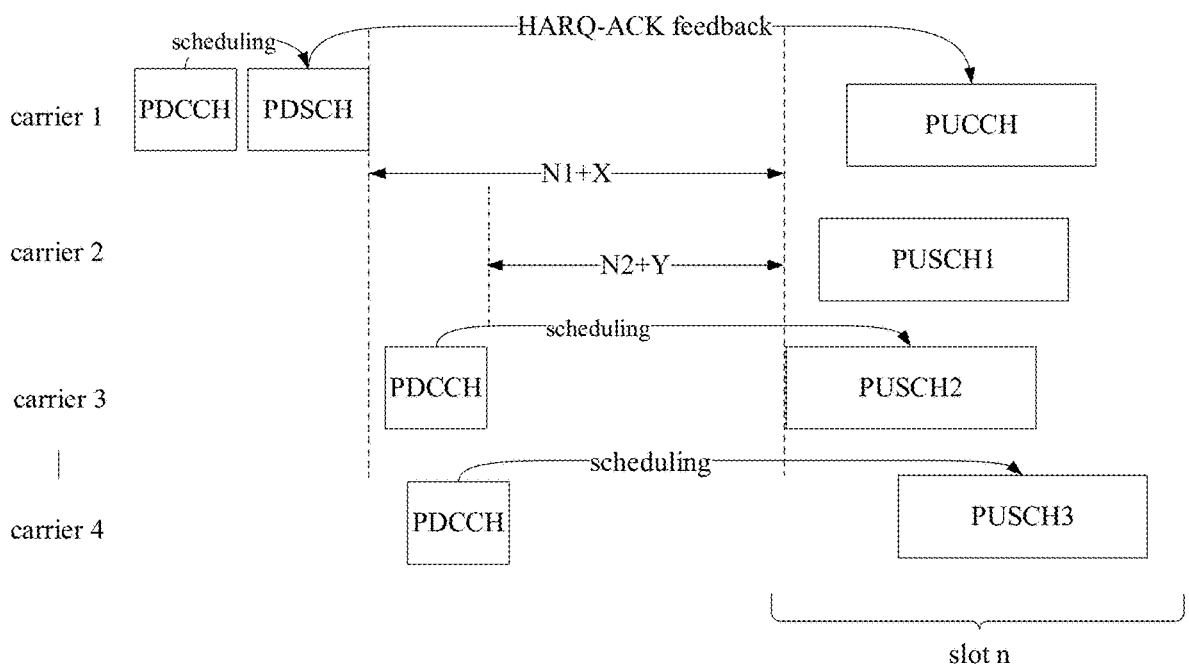
FIG. 6 shows a first schematic diagram of preset timeline judgment under the condition of a PUCCH overlapping with multiple PUSCHs in an uplink transmission method provided in an embodiment of the disclosure.
Figure 7:
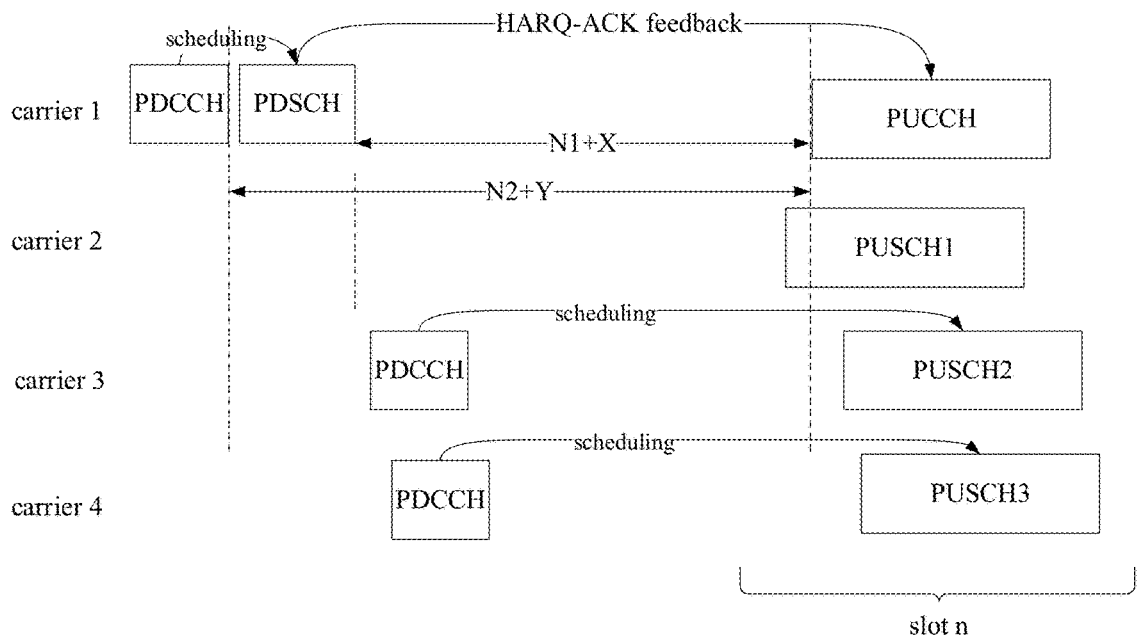
FIG. 7 shows a second schematic diagram of preset timeline judgment under the condition of a PUCCH overlapping with multiple PUSCHs in an uplink transmission method provided in an embodiment of the disclosure.

As shown in FIG. 6 and FIG. 7, it is assumed that a terminal is configured with four carriers, there is a PUCCH carrying a hybrid automatic repeat request acknowledgement (HARQ-ACK, which may be s referred to as AN) in a slot n on a carrier 1, and the HARQ-ACK carried on the PUCCH is an HARQ-ACK of a PDSCH scheduled by a PDCCH; there is a PUSCH1 (i.e., a scheduling-free PUSCH) without a corresponding PDCCH in a slot n on a carrier 2; and there is a PUSCH2 (i.e., a scheduling-based PUSCH) with a corresponding PDCCH in a slot n on a carrier 3, and there is a PUSCH3 (i.e., a scheduling-based PUSCH) with a corresponding PDCCH in a slot n on a carrier 4. It is assumed that none of the above PUSCHs (i.e., the PUSCH1, the PUSCH2, and the PUSCH3) carries an aperiodic (A)-CSI transmission. It is assumed that the above PUSCHs (i.e., the PUSCH1, the PUSCH2, and the PUSCH3) overlap with the PUCCH on the carrier 1.

Firstly, according to a PUSCH selection rule, PUSCH selection is performed. For example, the PUSCH selection rule is as follows: if the multiple PUSCHs include a PUSCH carrying an A-CSI, selecting the PUSCH carrying the A-CSI; if the multiple PUSCHs include a PUSCH with a corresponding PDCCH and a PUSCH without a corresponding PDCCH at the same time, selecting the PUSCH with the corresponding PDCCH; and if the multiple PUSCHs do not include a PUSCH carrying an A-CSI, and include multiple PUSCHs of the same type (for example, including multiple PUSCHs with corresponding PDCCHs or including multiple PUSCHs without corresponding PDCCHs), selecting a PUSCH on the carrier with a smallest carrier index.

According to the above PUSCH selection rule, since there is no PUSCH carrying an A-CSI, a PUSCH with a corresponding PDCCH is preferentially selected. That is to select the PUSCHs on the carriers 3 and 4, and the PUSCH on the carrier 2 is not selected for transmitting UCI. Furthermore, for the two PUSCHs on the carriers 3 and 4, the PUSCH on the carrier 3 is selected for transmitting UCI according to the principle of smallest carrier index. That is, the PUSCH on the carrier 3 is determined as the target uplink channel.

Then, the preset timeline judgment is performed on the PUSCH2 on the carrier 3 and the PUCCH on the carrier 1. For example, the preset timeline is defined as follows.

A first timeline: a first symbol of an earliest one of multiple channels to be judged is not earlier than N1+X symbols after a last symbol of a PDSCH; or called as that an interval between the first symbol of the earliest one of the multiple channels to be judged and the last symbol of the PDSCH is not less than N1+X symbols.

A second timeline: a first symbol of an earliest one of multiple channels to be judged is not earlier than N2+Y symbols after a last symbol of PDCCH used for scheduling PDSCH/PUSCH; or, called as that an interval between the first symbol of the earliest one of the multiple channels to be judged and the last symbol of the PDCCH used for scheduling PDSCH/PUSCH, is not less than N2+Y symbols.

N1 is a preset processing delay of PDSCH, N2 is a preset processing delay of PUSCH, and X and Y are additional processing delays.

According to the foregoing preset timeline, as shown in FIG. 6, for example, the PUSCH2 on the carrier 3 starts earlier than the PUCCH on the carrier 1, then the preset timeline judgement is performed on the PUSCH2 on the carrier 3, where the judgment is performed according to a last symbol of a PDCCH used for scheduling the PUSCH2, based on the second timeline. As shown in FIG. 7, for example, the PUCCH on the carrier 1 starts earlier than the PUSCH2 on the carrier 3, then the preset timeline judgement is performed on the PUCCH on the carrier 1, where the judgment is performed according to a last symbol of PDCCH used for scheduling PDSCH, based on the second timeline.

Finally, when the foregoing preset timeline is met, the terminal can transfer UCI carried on the PUCCH on the carrier 1 to the PUSCH2 on the carrier 3 for transmission, so that the PUCCH on the carrier 1 is not transmitted, thereby avoiding simultaneous transmission of PUCCH and PUSCH. Similarly, the base station side receives UCI, which is originally required to be transmitted on the PUCCH on the carrier 1, only in the PUSCH2 on the carrier 3, but no longer receives PUCCH carrying the UCI on the carrier 1.

In the foregoing process, it only needs to perform preset timeline judgement for a finally determined combination of PUCCH and PUSCH for UCI transmission, without performing preset timeline judgement for each PUSCH overlapping with PUCCH, thereby saving processing time. It is further avoided that when performing timeline judgment on a combination of other non-selected PUSCH and PUCCH, the time condition is not met, and then the terminal considers there is a wrong scheduling and generates erroneous transmission behavior. For example, when timeline judgment is performed on each combination of PUSCH and PUCCH, if the timeline is not met between unselected PUSCHs such as the PUSCH1 and the PUCCH, it will cause the terminal to deem that all scheduling between PUSCHs and PUCCHs at this time is wrong. Then, no specific behavior of the terminal exists, which means that the terminal can transmit randomly. The base station cannot determine the transmission behavior of the terminal, which causes the base station to fail to receive the terminal's transmission correctly. It further avoids excessive restrictions on the scheduling of the base station. If the timeline judgment are performed between each group of overlapped channels, in order to avoid wrong transmission behaviors caused by not meeting the timeline, the base station needs to ensure that all combinations of PUSCH and PUCCH should meet the timeline during scheduling, which provides excessive restrictions on the base station for scheduling PUSCH and PUCCH. However, in fact, it is meaningless to ensure that a combination of unselected PUSCH and PUCCH meets the timeline because this unselected PUSCH will not be used to transmit UCI on the PUCCH, and then the timeline judgment may not be performed. Therefore, the method of the present disclosure can avoid such restrictions on the scheduling of the base station.

On the other hand, for the scenario two, under the condition that the multiple uplink channels include multiple PUCCHs, the step 51 includes:

according to an uplink control information combination transmission rule, determining one PUCCH, which is able to carry uplink control information on the multiple PUCCHs, where the uplink control information combination transmission rule is the same as the uplink control information combination transmission rule in the related art and will not be described here.

The determined one PUCCH is one PUCCH of the multiple PUCCHs, or one PUCCH different from the multiple PUCCHs.

Accordingly, the step 52 includes:

performing preset timeline judgement for the determined one PUCCH and the multiple PUCCHs.

In an embodiment, performing preset timeline judgement for the determined one PUCCH and the multiple PUCCHs includes:

performing the following judgement for a channel with an earliest transmission time from the determined one PUCCH and the multiple PUCCHs:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays. For example, the additional processing delays at least include processing delay required to perform uplink control information combination or transfer.

The physical downlink shared channel (PDSCH) corresponding to PUCCH within the multiple uplink channels is specifically a PDSCH that requires HARQ-ACK feedback on the PUCCH within the multiple uplink channels.

The physical downlink control channel (PDCCH) corresponding to the target uplink channel is specifically as follows. If the target uplink channel is PUCCH, the PDCCH corresponding to the target uplink channel is, a PDCCH used for scheduling PDSCH that requires HARQ-ACK feedback on the PUCCH within the multiple uplink channels, or a PDCCH that requires HARQ-ACK feedback on the PUCCH within the multiple uplink channels and indicates downlink semi-persistent scheduling (SPS) resource release. If the target uplink channel is PUSCH, the PDCCH corresponding to the target uplink channel is a PDCCH used for scheduling the PUSCH (i.e., a PDCCH carrying UL grant).

Accordingly, the step 53 includes:

under the condition that the preset timeline is met, transmitting the uplink control information, which is carried on the multiple PUCCHs, on the determined one PUCCH. That is, the uplink control information (UCI) originally required to be carried on the multiple PUCCHs, is transferred to the determined one PUCCH for transmission without transmitting the multiple PUCCHs.

Embodiment Two

Figure 8:
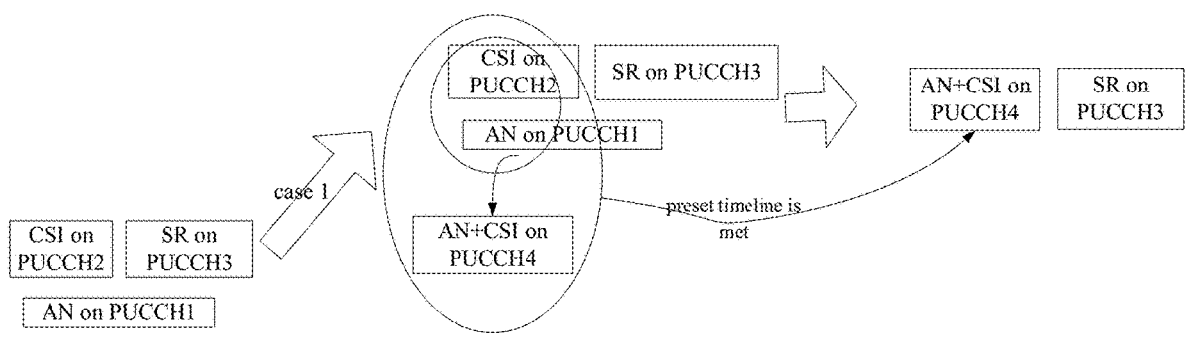
FIG. 8 shows a schematic diagram of a case 1 in which multiple PUCCHs are overlapped in an uplink transmission method provided in an embodiment of the disclosure.
Figure 9:
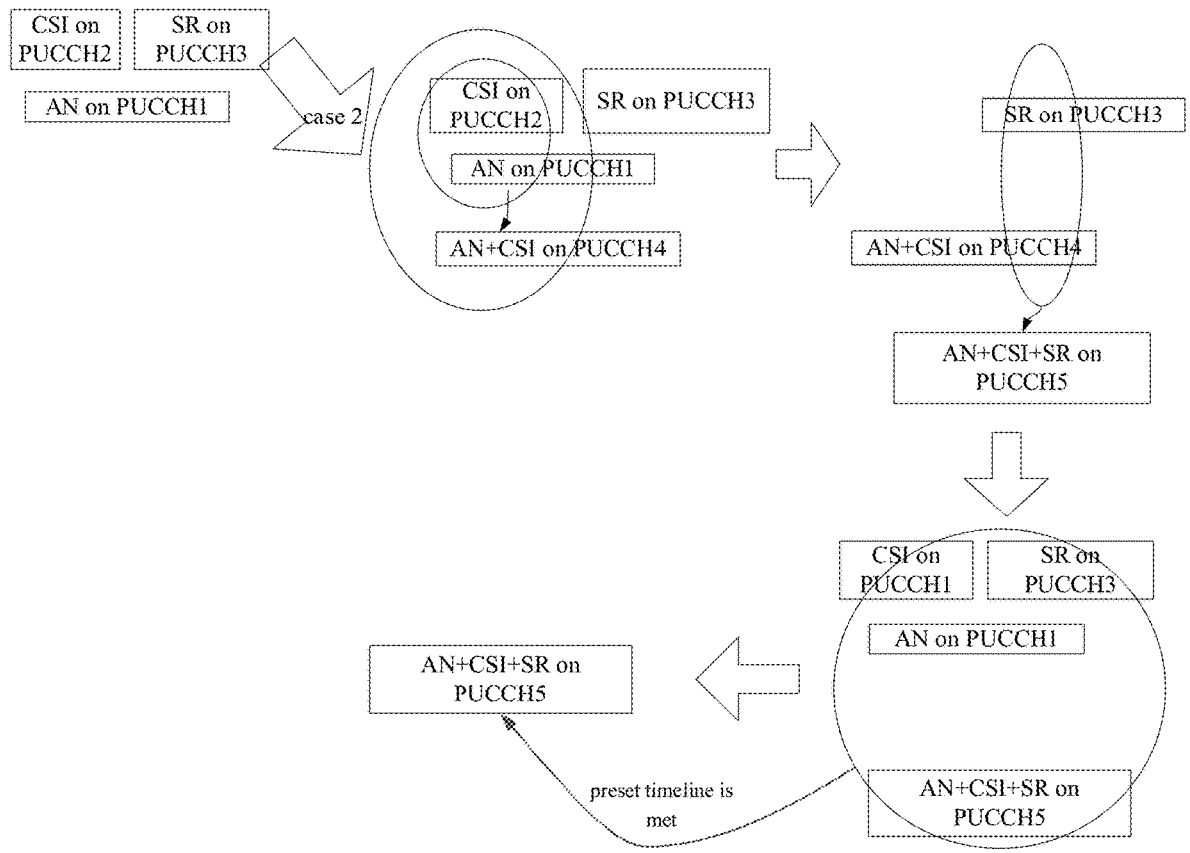
FIG. 9 shows a schematic diagram of a case 2 in which multiple PUCCHs are overlapped in an uplink transmission method provided in an embodiment of the disclosure.

As shown in FIG. 8 and FIG. 9, it is assumed that the terminal has three PUCCH transmissions simultaneously in slot n on a primary component carrier; PUCCH1 carries an HARQ-ACK (referred to as AN in the figure), and the HARQ-ACK is an HARQ-ACK for PDSCH scheduled by PDCCH; PUCCH2 carries channel state information (CSI); and PUCCH3 carries a scheduling request (SR).

Firstly, according to a UCI combination transmission rule, a final PUCCH for carrying UCI is determined. For example, for different PUCCH formats and different UCI combinations, the UCI combination transmission rule is shown in table 1. It is first determined that PUCCH2 carrying CSI is the earliest one of the PUCCHs. Taking the PUCCH2 carrying CSI as a target, it is determined that a PUCCH overlapping with the PUCCH2 carrying CSI, is PUCCH1 carrying HARQ-ACK. Then, according to a combination transmission rule for CSI and HARQ-ACK, it needs to determine one PUCCH used for simultaneously transmitting UCIs on PUCCH1 and PUCCH2. That is, according to a total number of bits of CSI and HARQ-ACK, selecting a resource set from multiple pre-configured PUCCH resource sets, and then determining a PUCCH resource in the selected PUCCH resource set according to a resource indication field in a PDCCH used for scheduling PDSCH, for example, recording the PUCCH resource as a PUCCH4.

As shown in FIG. 8, case 1: if there is no overlap between PUCCH4 and PUCCH3, the UCI combination transmission is ended. That is, the CSI and the HARQ-ACK are transmitted simultaneously on the PUCCH 4, the SR is transmitted on the PUCCH3, and these two PUCCHs do not overlap in the time domain and therefore can be transmitted separately.

As shown in FIG. 9, case 2: if there is overlapping between PUCCH4 and PUCCH3, it needs to further determine a PUCCH used for transmitting UCIs on the PUCCH4 and the PUCCH3 according to the UCI combination transmission rule. That is, according to a total number of bits of CSI, HARQ-ACK and SR, selecting a resource set from multiple pre-configured PUCCH resource sets, and then determining a PUCCH resource in the selected PUCCH resource set according to a resource indication field in a PDCCH used for scheduling PDSCH, for example, recording the PUCCH resource as a PUCCH5.

For the case 1, it is necessary to perform preset timeline judgment on a group of overlapping channels, including PUCCH4, PUCCH1 and PUCCH2, which are finally determined for combination UCI transmission, to determine whether UCIs on PUCCH1 and PUCCH2 can be transferred to PUCCH4 for transmission. For example, the preset timeline is defined as follows.

A first timeline: a first symbol of an earliest one of multiple channels to be judged is not earlier than N1+X symbols after a last symbol of a PDSCH; or called as that an interval between the first symbol of the earliest one of the multiple channels to be judged and the last symbol of the PDSCH is not less than N1+X symbols.

A second timeline: a first symbol of an earliest one of multiple channels to be judged is not earlier than N2+Y symbols after a last symbol of PDCCH used for scheduling PDSCH/PUSCH; or, called as that an interval between the first symbol of the earliest one of the multiple channels to be judged and the last symbol of the PDCCH used for scheduling PDSCH/PUSCH, is not less than N2+Y symbols.

N1 is a preset processing delay of PDSCH, N2 is a preset processing delay of PUSCH, and X and Y are additional processing delays.

For example, among PUCCH1, PUCCH2 and PUCCH4, PUCCH4 starts at the earliest time, then the preset timeline judgment is performed on PUCCH4. For another example, among PUCCH1, PUCCH2 and PUCCH4, PUCCH1 starts at the earliest time, then the preset timeline judgment is performed on PUCCH1. The judgment is performed according to a last symbol of a PDCCH used for scheduling PUSCH based on the second timeline. The judgment manner is the same as the judgment manner on PUCCH in the embodiment one, which is not repeated here.

When the preset timeline is met, the terminal can transfer UCIs (i.e., HARQ-ACK and CSI) carried on PUCCH1 and PUCCH2 to PUCCH4 for transmission, and PUCCH1 and PUCCH2 are not transmitted. In other words, PUCCH1 and PUCCH2 are replaced by PUCCH4, and then overlapping transmission of PUCCHs is avoided because PUCCH3 and PUCCH4 are not overlapped in the time domain and can be transmitted separately. Similarly, the base station side receives, on PUCCH4, UCIs (i.e., HARQ-ACK and CSI) which are originally required to be transmitted on PUCCH1 and PUCCH2, and receives SR on PUCCH3, without performing reception on PUCCH1 and PUCCH2.

As shown in FIG. 9, for the case 2, it is necessary to perform preset timeline judgment on a group of overlapping channels, including PUCCH5, PUCCH1, PUCCH2 and PUCCH3, which are finally determined for combination UCI transmission, to determine whether UCIs on PUCCH1, PUCCH2 and PUCCH3 can be transferred to PUCCH5 for transmission. The preset timeline is defined as in the case 1.

For example, among PUCCH1, PUCCH2, PUCCH3 and PUCCH5, PUCCH5 starts at the earliest time, then the preset timeline judgment is performed on PUCCH5. For another example, among PUCCH1, PUCCH2, PUCCH3 and PUCCH5, PUCCH1 starts at the earliest time, then the preset timeline judgment is performed on PUCCH1. The judgment is performed according to a last symbol of a PDCCH used for scheduling PUSCH based on the second timeline. The judgment manner is the same as the judgment manner on PUCCH in the embodiment one, which is not repeated here.

When the preset timeline is met, the terminal can transfer UCIs (i.e., HARQ-ACK, CSI and SR) carried on PUCCH1, PUCCH2 and PUCCH3 to PUCCH5 for transmission, and PUCCH1, PUCCH2 and PUCCH3 are not transmitted. In other words, PUCCH1, PUCCH2 and PUCCH3 are replaced by PUCCH5. Similarly, the base station side receives, on PUCCH5, UCIs (i.e., HARQ-ACK, CSI and SR) which are originally required to be transmitted on PUCCH1, PUCCH2 and PUCCH3, without performing reception on PUCCH1, PUCCH2 and PUCCH3.

In the foregoing process, it only needs to perform preset timeline judgement for a combination of finally determined PUCCH for UCI transmission and the original overlapped PUSCH, without performing preset timeline judgement for every two overlapped PUCCHs, thereby saving processing time.

TABLE 1

| Uplink control information (UCI) combination transmission rule | | | | | | |
|---|---|---|---|---|---|---|
| SR | | HARQ-ACK | | CSI | | |
| PF0 | PF1 | PF0 | PF1 | PF2/3/4 | PF2/3/4 | UCI Combination Transmission Rule |
| ✓ | | ✓ | | | | HARQ-ACK implicitly expresses SR state by selecting different cyclic shift sets on PUCCH resource corresponding to the HARQ-ACK; When multiple SR configurations overlap with the HARQ-ACK, as long as one of the SR configurations is periodic (P)-SR, the P-SR state is determined to be used in transmission: |
| ✓ | | | ✓ | | | HARQ-ACK is transmitted on PUCCH resource corresponding to the HARQ-ACK, and if P-SR exists, the P-SR is discarded; |
| | ✓ | | ✓ | | | When the state is N-SR, HARQ-ACK is transmitted on PUCCH resource corresponding to the HARQ-ACK, and when the state is P-SR, HARQ-ACK is transmitted on PUCCH resource corresponding to the SR, that is to say, the SR state is implicitly expressed by transmitting the HARQ-ACK on PUCCH resource corresponding to which kinds of UCIs; |
| | ✓ | | | ✓ | | HARQ-ACK and SR are simultaneously transmitted on PUCCH resource corresponding to the HARQ-ACK; |
| | ✓ | | | | ✓ | CSI and SR are simultaneously transmitted on PUCCH resources corresponding to the CSI; |
| | | | ✓ | | ✓ | For situation that HARQ-ACK of SPS PDSCH overlaps CSI, the CSI may be discarded or such a configuration may not be supported in the system; |
| | ✓ | | ✓ | | ✓ | For situation that HARQ-ACK of SPS PDSCH overlaps CSI, the CSI may be discarded or such a configuration may not be supported in the system; the rest overlapping of the HARQ-ACK and the SR follows the above-mentioned relevant definitions directly; |

TABLE 1-continued

Uplink control information (UCI) combination transmission rule

| SR | | HARQ-ACK | | | CSI | |
|---|---|---|---|---|---|---|
| PF0 | PF1 | PF0 | PF1 | PF2/3/4 | PF2/3/4 | UCI Combination Transmission Rule |
| | | | ✓ | | ✓ | For overlapping situation between HARQ-ACK and CSI of downlink transmission having corresponding PDCCH, when high-layer signaling configuration supports simultaneous transmission of HARQ-ACK and CSI, multiple PUCCH resource sets are assumed to exist, one PUCCH resource set is selected from the multiple PUCCH resource sets according to the total bit number of HARQ-ACK and CSI, one PUCCH resource in the selected PUCCH resource set according to the HARQ-ACK resource indication field in the PDCCH, and the HARQ-ACK and the CSI are simultaneously transmitted on the determined resource; and when the high-layer signaling configuration does not support the simultaneous transmission of HARQ-ACK and CSI, the CSI is discarded; |
| ✓ | | | ✓ | | ✓ | For overlapping situation between HARQ-ACK and CSI of downlink transmission having corresponding PDCCH, when high-layer signaling configuration supports simultaneous transmission of HARQ-ACK and CSI, multiple PUCCH resource sets are assumed to exist, one PUCCH resource set is selected from the multiple PUCCH resource sets according to the total bit number of the HARQ-ACK, SR, and the CSI, one PUCCH resource is determined in the selected PUCCH resource set according to the HARQ-ACK resource indication field in the PDCCH, and the HARQ-ACK, the SR, and the CSI are simultaneously transmitted on the determined resource; and when the high-layer signaling configuration does not support the simultaneous transmission of HARQ-ACK and CSI, the CSI is discarded; the rest overlapping of the HARQ-ACK and the SR follows the above-mentioned relevant definitions directly; |

It should be noted that, the PF indicates a PUCCH format, the P-SR indicates positive SR, and the N-SR indicates negative SR in Table 1.

In summary, in the uplink transmission method provided in the above embodiments of the present disclosure, when multiple uplink channels are overlapped in the time domain, first determining the target uplink channel by using the preset rule, then performing preset timeline judgement for the determined target uplink channel and PUCCH within the multiple uplink channels, and performing corresponding uplink transmission according to a judgment result, only one timeline judgment needs to be performed on an uplink channel group composed of the target uplink channel and the PUCCH within the multiple uplink channels, which can avoid complicated steps of performing one timeline judgment on every two overlapped channels, thereby improving processing efficiency. Meanwhile, it is also possible to avoid erroneous transmission behaviors of the terminal caused by that the timeline is not met by some channels which are not selected for transmitting the uplink control information (UCI), when performing timeline judgment on every two overlapped channels.

Figure 10:
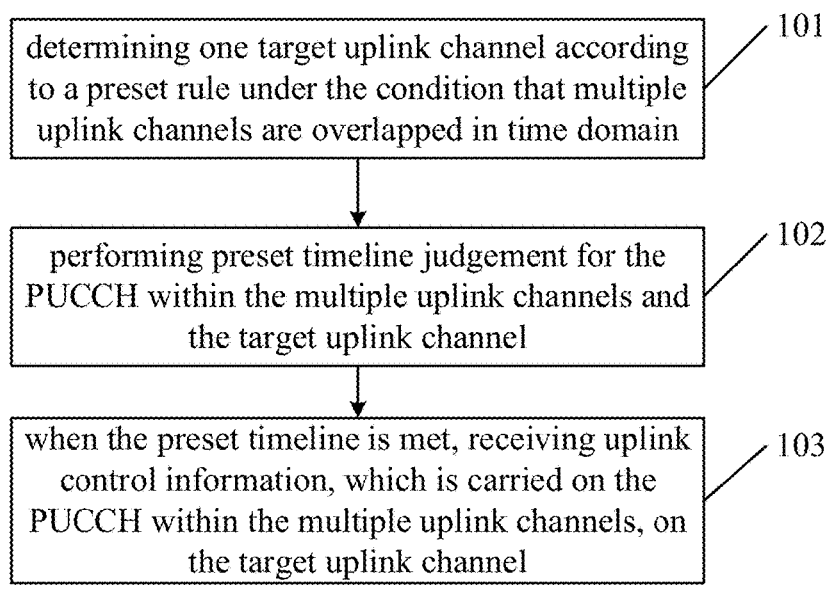
FIG. 10 shows a second flowchart of an uplink transmission method provided in an embodiment of the disclosure.

As shown in FIG. 10, one embodiment of the present disclosure further provides an uplink transmission method applied to a network device, including:

Step 101: determining one target uplink channel according to a preset rule under the condition that multiple uplink channels are overlapped in time domain; where the multiple uplink channels include at least one physical uplink control channel (PUCCH);

Step 102: performing preset timeline judgement for the PUCCH within the multiple uplink channels and the target uplink channel;

Step 103: when the preset timeline is met, receiving uplink control information, which is carried on the PUCCH within the multiple uplink channels, on the target uplink channel.

Furthermore, in the above embodiments of the disclosure, the method further includes:

when the preset timeline is not met, determining that overlapping of multiple uplink channels in the time domain is an erroneous scheduling or configuration. That is, if no specific transmission behavior is specified at this time, it will lead to inconsistent understanding of the transmission channels between the terminal and the base station. Thus, in order to avoid such scheduling error, when scheduling, the base station needs to confirm that the timeline is met between the scheduled overlapping channels.

It should be noted that in the above embodiments of the disclosure, the overlapping of multiple uplink channels in the time domain at least include the following two scenarios:

scenario one: PUCCH overlaps with multiple PUSCHs in the time domain;

scenario two: multiple PUCCHs overlapped in the time domain.

On the one hand, for the scenario one, under the condition that multiple uplink channels overlapped in the time domain include one PUCCH and multiple physical uplink control channels (PUSCHs), the step 101 includes:

selecting one PUSCH from the multiple PUSCHs as the target uplink channel according to a PUSCH selection rule; where the PUSCH selection rule is the same as the PUSCH selection rule in the related art and will not be described here.

Correspondingly, the step 102 includes:

performing preset timeline judgment on the selected one PUSCH and the PUCCH.

In one embodiment, performing preset timeline judgment on the selected one PUSCH and the PUCCH includes:

performing following judgement for a channel with an earliest transmission time from the selected PUSCH and the PUCCH:

a first symbol of the channel with the earliest transmission time is not earlier than N1+X symbols after a last symbol of a physical downlink shared channel (PDSCH) corresponding to the PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays; for example, the additional processing delays at least include a processing delay required for performing uplink control information combination or transfer.

The physical downlink shared channel (PDSCH) corresponding to the PUCCH within the multiple uplink channels is specifically a PDSCH that requires hybrid automatic repeat request-acknowledge (HARQ-ACK) feedback on the PUCCH within the multiple uplink channels.

The physical downlink control channel (PDCCH) corresponding to the target uplink channel is specifically as follows. If the target uplink channel is PUCCH, the PDCCH corresponding to the target uplink channel is, a PDCCH used for scheduling PDSCH that requires HARQ-ACK feedback on the PUCCH within the multiple uplink channels, or a PDCCH that requires HARQ-ACK feedback on the PUCCH within the multiple uplink channels and indicates downlink semi-persistent scheduling (SPS) resource release. If the target uplink channel is PUSCH, the PDCCH corresponding to the target uplink channel is a PDCCH used for scheduling the PUSCH (i.e., a PDCCH carrying UL grant).

Accordingly, the step 103 includes:

under the condition that the preset timeline is met, receiving the uplink control information, which is carried on the PUCCH, on the selected one PUSCH. That is, the uplink control information (UCI) originally required to be carried on the PUCCH, is received on the selected PUSCH without performing reception on the PUCCH.

On the other hand, for the scenario two, under the condition that the multiple uplink channels include multiple PUCCHs, the step 101 includes:

according to an uplink control information combination transmission rule, determining one PUCCH, which is able to carry uplink control information on the multiple PUCCHs, where the uplink control information combination transmission rule is the same as the uplink control information combination transmission rule in the related art and will not be described here.

The determined one PUCCH is one PUCCH of the multiple PUCCHs, or one PUCCH different from the multiple PUCCHs.

Accordingly, the step 102 includes:

performing preset timeline judgement for the determined one PUCCH and the multiple PUCCHs.

In an embodiment, performing preset timeline judgement for the determined one PUCCH and the multiple PUCCHs includes:

performing the following judgement for a channel with an earliest transmission time from the determined one PUCCH and the multiple PUCCHs:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays. For example, the additional processing delays at least include processing delay required to perform uplink control information combination or transfer.

The physical downlink shared channel (PDSCH) corresponding to PUCCH within the multiple uplink channels is specifically a PDSCH that requires HARQ-ACK feedback on the PUCCH within the multiple uplink channels.

The physical downlink control channel (PDCCH) corresponding to the target uplink channel is specifically as follows. If the target uplink channel is PUCCH, the PDCCH corresponding to the target uplink channel is, a PDCCH used for scheduling PDSCH that requires HARQ-ACK feedback on the PUCCH within the multiple uplink channels, or a PDCCH that requires HARQ-ACK feedback on the PUCCH within the multiple uplink channels and indicates downlink semi-persistent scheduling (SPS) resource release. If the target uplink channel is PUSCH, the PDCCH corresponding to the target uplink channel is a PDCCH used for scheduling the PUSCH (i.e., a PDCCH carrying UL grant).

Accordingly, the step 103 includes:

under the condition that the preset timeline is met, receiving the uplink control information, which is carried on the multiple PUCCHs, on the determined one PUCCH. That is, the uplink control information (UCI) originally required to be carried on the multiple PUCCHs, is received on the determined one PUCCH without performing reception on the multiple PUCCHs.

In summary, in the uplink transmission method provided in the above embodiments of the present disclosure, when multiple uplink channels are overlapped in the time domain, first determining the target uplink channel by using the preset rule, then performing preset timeline judgement for the determined target uplink channel and PUCCH within the multiple uplink channels, and performing corresponding uplink transmission according to a judgment result, only one timeline judgment needs to be performed on an uplink channel group composed of the target uplink channel and the PUCCH within the multiple uplink channels, which can avoid complicated steps of performing one timeline judgment on every two overlapped channels, thereby improving processing efficiency. Meanwhile, it is also possible to avoid erroneous transmission behaviors of the terminal caused by that the timeline is not met by some channels which are not selected for transmitting the uplink control information (UCI), when performing timeline judgment on every two overlapped channels.

Figure 11:
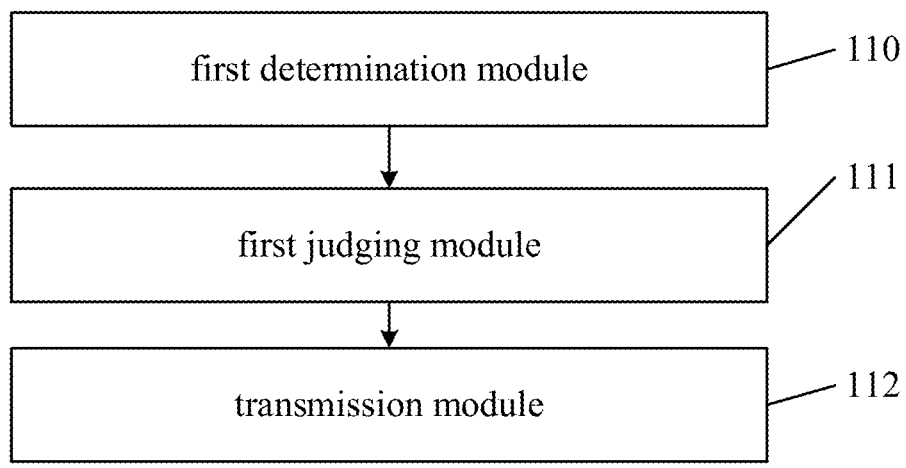
FIG. 11 shows a first schematic structural diagram of an uplink transmission device provided in an embodiment of the disclosure.

As shown in FIG. 11, one embodiment of the present disclosure further provides an uplink transmission device applied to a terminal, including:

a first determination module 110 configured for determining one target uplink channel according to a preset rule under the condition that multiple uplink channels are overlapped in time domain; where the multiple uplink channels include at least one physical uplink control channel (PUCCH);

a first judging module 111 configured for performing preset timeline judgement for the PUCCH within the multiple uplink channels and the target uplink channel;

a transmission module 112 configured for, when the preset timeline is met, transmitting uplink control information, which is carried on the PUCCH within the multiple uplink channels, on the target uplink channel.

Furthermore, in the above embodiments of the disclosure, the device further includes:

a first error determination module configured for, when the preset timeline is not met, determining that overlapping of multiple uplink channels in the time domain is an erroneous scheduling or configuration.

Optionally, in the above embodiments of the present disclosure, under the condition that the multiple uplink channels include one PUCCH and multiple physical uplink control channels (PUSCHs), the first determination module is configured for selecting one PUSCH from the multiple PUSCHs according to a PUSCH selection rule;

the first judging module is configured for performing preset timeline judgment on the selected PUSCH and the PUCCH;

the transmission module is configured for, under the condition that the preset timeline is met, transmitting the uplink control information, which is carried on the PUCCH, on the selected PUSCH.

Optionally, in the above embodiments of the present disclosure, under the condition that the multiple uplink channels include multiple PUCCHs, the first determination module is configured for, according to an uplink control information combination transmission rule, determining one PUCCH, which is able to carry uplink control information on the multiple PUCCHs.

The determined one PUCCH is one PUCCH of the multiple PUCCHs, or one PUCCH different from the multiple PUCCHs.

The first judging module is configured for performing preset timeline judgement for the determined one PUCCH and the multiple PUCCHs.

The transmission module is configured for, under the condition that the preset timeline is met, transmitting the uplink control information, which is carried on the multiple PUCCHs, on the determined one PUCCH.

Optionally, in the above embodiments of the present disclosure, the first judging module is further configured for performing the following judgement for a channel with an earliest transmission time on the PUCCH in the multiple PUCCHs and the target uplink channel:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays.

In summary, in the uplink transmission device provided in the above embodiments of the present disclosure, when multiple uplink channels are overlapped in the time domain, first determining the target uplink channel by using the preset rule, then performing preset timeline judgement for the determined target uplink channel and PUCCH within the multiple uplink channels, and performing corresponding uplink transmission according to a judgment result, only one timeline judgment needs to be performed on an uplink channel group composed of the target uplink channel and the PUCCH within the multiple uplink channels, which can avoid complicated steps of performing one timeline judgment on every two overlapped channels, thereby improving processing efficiency. Meanwhile, it is also possible to avoid erroneous transmission behaviors of the terminal caused by that the timeline is not met by some channels which are not selected for transmitting the uplink control information (UCI), when performing timeline judgment on every two overlapped channels.

It should be noted that the uplink transmission device provided in the above embodiment of the present disclosure is an uplink transmission device capable of implementing the above-mentioned uplink transmission method, and all the embodiments of the above uplink transmission method are applicable to the uplink transmission device and can achieve the same or similar beneficial effects.

Figure 12:
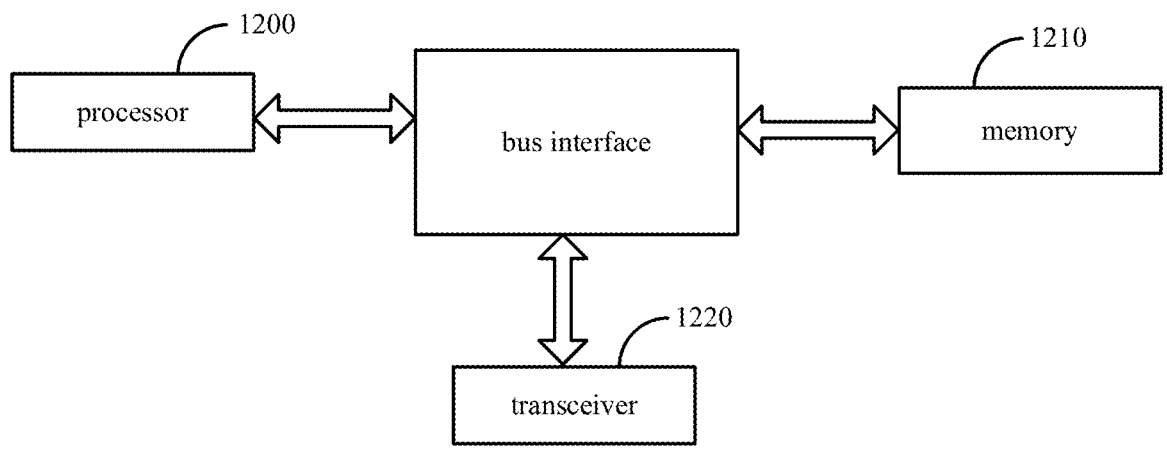
FIG. 12 shows a schematic structural diagram of a terminal and a network device provided in an embodiment of the disclosure.

As shown in FIG. 12, one embodiment of the present disclosure further provides a terminal including: a transceiver 1220, a memory 1210, a processor 1200, and computer programs stored on the memory 1210 and executable on the processor 1200. The processor 1200 is configured for reading the programs in the memory for performing the following processes:

determining one target uplink channel according to a preset rule under the condition that multiple uplink channels are overlapped in time domain; where the multiple uplink channels include at least one physical uplink control channel (PUCCH);

performing preset timeline judgement for the PUCCH within the multiple uplink channels and the target uplink channel.

The transceiver 1220 is configured for, when the preset timeline is met, transmitting uplink control information, which is carried on the PUCCH within the multiple uplink channels, on the target uplink channel.

Optionally, in the above embodiments of the present disclosure, the processor 1200 is further configured for:

when the preset timeline is not met, determining that overlapping of multiple uplink channels in the time domain is an erroneous scheduling or configuration.

Optionally, in the above embodiments of the present disclosure, under the condition that the multiple uplink channels include one PUCCH and multiple physical uplink control channels (PUSCHs), the processor 1200 is further configured for:

selecting one PUSCH from the multiple PUSCHs according to a PUSCH selection rule;

performing preset timeline judgment on the selected PUSCH and the PUCCH.

The transceiver 1220 is further configured for:

under the condition that the preset timeline is met, transmitting the uplink control information, which is carried on the PUCCH, on the selected PUSCH.

Optionally, in the above embodiments of the present disclosure, under the condition that the multiple uplink channels include multiple PUCCHs, the processor 1200 is further configured for:

according to an uplink control information combination transmission rule, determining one PUCCH, which is able to carry uplink control information on the multiple PUCCHs; where the determined one PUCCH is one PUCCH of the multiple PUCCHs, or one PUCCH different from the multiple PUCCHs;

performing preset timeline judgement for the determined one PUCCH and the multiple PUCCHs.

The transceiver 1220 is further configured for, under the condition that the preset timeline is met, transmitting the uplink control information, which is carried on the multiple PUCCHs, on the determined one PUCCH.

Optionally, in the above embodiments of the present disclosure, the processor is further configured for:

performing the following judgement for a channel with an earliest transmission time on the PUCCH in the multiple PUCCHs and the target uplink channel:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays.

In summary, in the terminal provided in the above embodiments of the present disclosure, when multiple uplink channels are overlapped in the time domain, first determining the target uplink channel by using the preset rule, then performing preset timeline judgement for the determined target uplink channel and PUCCH within the multiple uplink channels, and performing corresponding uplink transmission according to a judgment result, only one timeline judgment needs to be performed on an uplink channel group composed of the target uplink channel and the PUCCH within the multiple uplink channels, which can avoid complicated steps of performing one timeline judgment on every two overlapped channels, thereby improving processing efficiency. Meanwhile, it is also possible to avoid erroneous transmission behaviors of the terminal caused by that the timeline is not met by some channels which are not selected for transmitting the uplink control information (UCI), when performing timeline judgment on every two overlapped channels.

It should be noted that the terminal provided in the above embodiment of the present disclosure is a terminal capable of implementing the above-mentioned uplink transmission method, and all the embodiments of the above uplink transmission method are applicable to the terminal and can achieve the same or similar beneficial effects.

One embodiment of the present disclosure further provides a computer readable storage medium storing computer programs thereon. The computer programs are executed by the processor to cause the processor to implement the processes of the embodiments of the uplink transmission method as described above and the same technical effects can be achieved, which will not be described in detail in order to avoid repetition. The computer readable storage medium, for example, may be a read-only memory (ROM), a random access memory (RAM), a magnetic disk or an optical disk, and the like.

Figure 13:
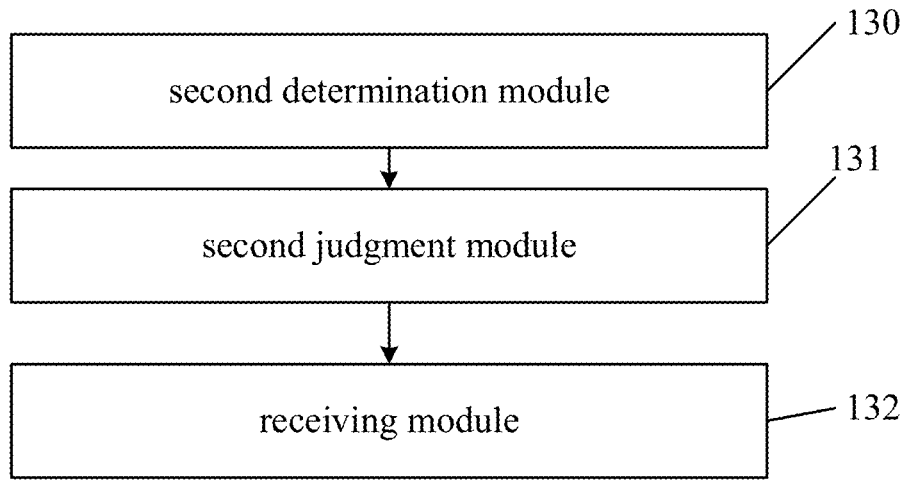
FIG. 13 is a second schematic structural diagram of an uplink transmission device provided in an embodiment of the disclosure.

As shown in FIG. 13, one embodiment of the present disclosure further provides an uplink transmission device applied to a network device, including:

a second determination module 130 configured for determining one target uplink channel according to a preset rule under the condition that multiple uplink channels are overlapped in time domain; where the multiple uplink channels include at least one physical uplink control channel (PUCCH);

a second judgment module 131 configured for performing preset timeline judgement for the PUCCH within the multiple uplink channels and the target uplink channel;

a receiving module 132 configured for, when the preset timeline is met, receiving uplink control information, which is carried on the PUCCH within the multiple uplink channels, on the target uplink channel.

Optionally, in the above embodiments of the present disclosure, the device further includes:

a second error determination module configured for, when the preset timeline is not met, determining that overlapping of multiple uplink channels in the time domain is an erroneous scheduling or configuration.

Optionally, in the above embodiments of the present disclosure, under the condition that the multiple uplink channels include one PUCCH and multiple physical uplink control channels (PUSCHs), the second determination module is configured for selecting one PUSCH from the multiple PUSCHs according to a PUSCH selection rule;

the second judging module is configured for performing preset timeline judgment on the selected one PUSCH and the PUCCH.

the receiving module is configured for, under the condition that the preset timeline is met, receiving the uplink control information, which is carried on the PUCCH, on the selected PUSCH.

Optionally, in the above embodiments of the present disclosure, under the condition that the multiple uplink channels include multiple PUCCHs, the second determination module is configured for, according to an uplink control information combination transmission rule, determining one PUCCH, which is able to carry uplink control information on the multiple PUCCHs.

The determined one PUCCH is one PUCCH of the multiple PUCCHs, or one PUCCH different from the multiple PUCCHs.

The second judgment module is configured for performing preset timeline judgement for the determined one PUCCH and the multiple PUCCHs.

The receiving module is configured for, under the condition that the preset timeline is met, receiving the uplink control information, which is carried on the multiple PUCCHs, on the determined one PUCCH.

Optionally, in the above embodiments of the present disclosure, the second judging module is further configured for performing the following judgement for a channel with an earliest transmission time from the PUCCH in the multiple PUCCHs and the target uplink channel:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays.

In summary, in the uplink transmission device provided in the above embodiments of the present disclosure, when multiple uplink channels are overlapped in the time domain, first determining the target uplink channel by using the preset rule, then performing preset timeline judgement for the determined target uplink channel and PUCCH within the multiple uplink channels, and performing corresponding uplink transmission according to a judgment result, only one timeline judgment needs to be performed on an uplink channel group composed of the target uplink channel and the PUCCH within the multiple uplink channels, which can avoid complicated steps of performing one timeline judgment on every two overlapped channels, thereby improving processing efficiency. Meanwhile, it is also possible to avoid erroneous transmission behaviors of the terminal caused by that the timeline is not met by some channels which are not selected for transmitting the uplink control information (UCI), when performing timeline judgment on every two overlapped channels.

It should be noted that the uplink transmission device provided in the above embodiments of the present disclosure is an uplink transmission device capable of implementing the above uplink transmission method, and all the embodiments of the above uplink transmission method are applicable to the uplink transmission device and can achieve the same or similar beneficial effects.

As shown in FIG. 12, one embodiment of the present disclosure further provides a network device, including: a transceiver 1220, a memory 1210, a processor 1200, and computer programs stored on the memory 1210 and executable on the processor 1200. The processor 1200 is configured for reading the programs in the memory and performing the following processes:

determining one target uplink channel according to a preset rule under the condition that multiple uplink channels are overlapped in time domain; where the multiple uplink channels include at least one physical uplink control channel (PUCCH);

performing preset timeline judgement for the PUCCH within the multiple uplink channels and the target uplink channel.

The transceiver 1220 is configured for, when the preset timeline is met, receiving uplink control information, which is carried on the PUCCH within the multiple uplink channels, on the target uplink channel.

Optionally, in the above embodiments of the present disclosure, the processor 1200 is further configured for:

when the preset timeline is not met, determining that overlapping of multiple uplink channels in the time domain is an erroneous scheduling or configuration.

Optionally, in the above embodiments of the present disclosure, under the condition that multiple uplink channels include one PUCCH and multiple physical uplink control channels (PUSCHs), the processor 1200 is further configured for:

selecting one PUSCH from the multiple PUSCHs according to a PUSCH selection rule;
performing preset timeline judgment on the selected one PUSCH and the PUCCH.

The transceiver is further configured for, under the condition that the preset timeline is met, receiving the uplink control information, which is carried on the PUCCH, on the selected PUSCH.

Optionally, in the above embodiments of the present disclosure, under the condition that the multiple uplink channels include multiple PUCCHs, the processor 1200 is further configured for:

according to an uplink control information combination transmission rule, determining one PUCCH, which is able to carry uplink control information on the multiple PUCCHs; where the determined one PUCCH is one PUCCH of the multiple PUCCHs, or one PUCCH different from the multiple PUCCHs;

performing preset timeline judgement for the determined one PUCCH and the multiple PUCCHs.

The transceiver 1220 is further configured for:
under the condition that the preset timeline is met, receiving the uplink control information, which is carried on the multiple PUCCHs, on the determined one PUCCH.

Optionally, in the above embodiments of the present disclosure, the processor is further configured for:

performing the following judgement for a channel with an earliest transmission time on the PUCCH in the multiple PUCCHs and the target uplink channel:

a first symbol of the channel with the earliest transmission time is not earlier than N1+X symbols after a last symbol of a physical downlink shared channel (PDSCH) corresponding to PUCCH within the multiple uplink channels; and the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays.

In summary, in the network device provided in the above embodiments of the present disclosure, when multiple uplink channels are overlapped in the time domain, first determining the target uplink channel by using the preset rule, then performing preset timeline judgement for the determined target uplink channel and PUCCH within the multiple uplink channels, and performing corresponding uplink transmission according to a judgment result, only one timeline judgment needs to be performed on an uplink channel group composed of the target uplink channel and the PUCCH within the multiple uplink channels, which can avoid complicated steps of performing one timeline judgment on every two overlapped channels, thereby improving processing efficiency. Meanwhile, it is also possible to avoid erroneous transmission behaviors of the terminal caused by that the timeline is not met by some channels which are not selected for transmitting the uplink control information (UCI), when performing timeline judgment on every two overlapped channels.

It should be noted that the network device provided in the above embodiment of the present disclosure is a network device capable of implementing the above-mentioned uplink transmission method, and all the embodiments of the above uplink transmission method are applicable to the network device and can achieve the same or similar beneficial effects.

One embodiment of the present disclosure further provides a computer readable storage medium storing computer programs thereon. The computer programs are executed by the processor to cause the processor to implement the processes of the embodiments of the uplink transmission method as described above and the same technical effects can be achieved, which will not be described in detail in order to avoid repetition. The computer readable storage medium, for example, may be a read-only memory (ROM), a random access memory (RAM), a magnetic disk or an optical disk, and the like.

It is to be understood that the terms such as "include" and "comprises" or their variations used in the specification are intended to encompass a non-exclusive inclusion, such that a process, method, article or device that include a series of elements include not only those elements but also other elements that are not explicitly listed, or elements that are inherent to such process, method, article, or device. Without more restrictions, an element defined by the sentence "including a . . . " does not exclude existence of other identical element in the process, method, article or device that includes the element.

Through the description of the above embodiments, those skilled in the art can clearly understand that the foregoing embodiment method can be implemented by means of software plus a necessary general hardware platform, and, can also be through hardware, but in many cases, the former is better. Based on such understanding, the technical solution of the present disclosure essentially or the part that contributes to the prior art may be embodied in the form of a software product. A computer software product is stored in a storage medium (such as ROM/RAM, magnetic disk, optical disk), including several instructions to enable a terminal (which may be a mobile phone, a computer, a server, or a network device, etc.) to execute the method described in each embodiment of the present disclosure.

The embodiments of the present disclosure have been described above with reference to the drawings, but the present disclosure is not limited to the foregoing specific embodiments. The foregoing specific embodiments are merely illustrative and not restrictive. In the light of the present disclosure, those skilled in the art may make many variations without departing from the sprit and the protection scope of the claims, which fall within the protection of the present disclosure.

The above are merely the optional embodiments of the present disclosure and shall not be used to limit the scope of the present disclosure. A person skilled in the art may make improvements and modifications without departing from the principle of the present disclosure, and these improvements and modifications shall also fall within the scope of the present disclosure. Therefore, the protection scope of the present disclosure should be determined by the scope of the claims.

What is claimed is:

1. An uplink transmission method, applied to a terminal, comprising:
    determining one target uplink channel according to a preset rule under the condition that multiple uplink channels are overlapped in time domain; wherein the multiple uplink channels include one physical uplink control channel (PUCCH) and multiple physical uplink control channels (PUSCHs);
    performing preset timeline judgement for the PUCCH within the multiple uplink channels and the target uplink channel;
    when the preset timeline is met, transmitting uplink control information, which is carried on the PUCCH within the multiple uplink channels, on the target uplink channel;
    wherein the performing preset timeline judgement for the PUCCH within the multiple uplink channels and the target uplink channel, includes:
    performing the following judgement for a channel with an earliest transmission time from the PUCCH within the multiple uplink channels and the target uplink channel:
    a first symbol of the channel with the earliest transmission time is not earlier than N1+X symbols after a last symbol of a physical downlink shared channel (PDSCH) corresponding to the PUCCH within the multiple uplink channels; and
    the first symbol of the channel with the earliest transmission time is not earlier than N2+Y symbols after a last symbol of a physical downlink control channel (PDCCH) corresponding to the target uplink channel;
    wherein N1 is a preset processing delay of PDSCH, N2 is a preset processing delay of PUSCH, and X and Y are preset additional processing delays.

2. The method according to claim 1, further comprising:
    when the preset timeline is not met, determining that overlapping of the multiple uplink channels in the time domain is an erroneous scheduling or configuration.

3. The method according to claim 1, wherein
    the determining one target uplink channel according to a preset rule, includes: selecting one PUSCH from the multiple PUSCHs according to a PUSCH selection rule;
    the performing preset timeline judgement for the PUCCH within the multiple uplink channels and the target uplink channel, includes: performing preset timeline judgment for the selected one PUSCH and the PUCCH;
    when the preset timeline is met, transmitting uplink control information, which is carried on the PUCCH within the multiple uplink channels, on the target uplink channel, includes: under the condition that the preset timeline is met, transmitting the uplink control information, which is carried on the PUCCH, on the selected PUSCH.

4. An uplink transmission method, applied to a network device, comprising:
    determining one target uplink channel according to a preset rule under the condition that multiple uplink channels are overlapped in time domain; wherein the multiple uplink channels include one physical uplink control channel (PUCCH) and multiple physical uplink control channels (PUSCHs);
    performing preset timeline judgement for the PUCCH within the multiple uplink channels and the target uplink channel;
    when the preset timeline is met, receiving uplink control information, which is carried on the PUCCH within the multiple uplink channels, on the target uplink channel;
    wherein the performing preset timeline judgement for the PUCCH within the multiple uplink channels and the target uplink channel, includes:
    performing the following judgement for a channel with an earliest transmission time from the PUCCH within the multiple uplink channels and the target uplink channel:
    a first symbol of the channel with the earliest transmission time is not earlier than N1+X symbols after a last symbol of a physical downlink shared channel (PDSCH) corresponding to PUCCH within the multiple uplink channels; and
    the first symbol of the channel with the earliest transmission time is not earlier than N2+Y symbols after a last symbol of a physical downlink control channel (PDCCH) corresponding to the target uplink channel;

where N1 is a preset processing delay of PDSCH, N2 is a preset processing delay of PUSCH, and X and Y are preset additional processing delays.

5. The method according to claim 4, further comprising:
when the preset timeline is not met, determining that overlapping of multiple uplink channels in the time domain is an erroneous scheduling or configuration.

6. The method according to claim 4, wherein
the determining one target uplink channel according to a preset rule, includes: selecting one PUSCH from the multiple PUSCHs channel according to a PUSCH selection rule;
the performing preset timeline judgement for the PUCCH within the multiple uplink channels and the target uplink channel, includes: performing preset timeline judgment on the selected one PUSCH and the PUCCH;
when the preset timeline is met, receiving uplink control information, which is carried on the PUCCH within the multiple uplink channels, on the target uplink channel, includes: under the condition that the preset timeline is met, receiving the uplink control information, which is carried on the PUCCH, on the selected one PUSCH.

7. A terminal, comprising: a transceiver, a memory, a processor and computer programs stored on the memory and operable on the processor;
wherein the processor is configured for reading the programs in the memory and implementing the following processes:
determining one target uplink channel according to a preset rule under the condition that multiple uplink channels are overlapped in time domain; wherein the multiple uplink channels include one physical uplink control channel (PUCCH) and multiple physical uplink control channels (PUSCHs);
performing preset timeline judgement for the PUCCH within the multiple uplink channels and the target uplink channel;
the transceiver is configured for, when the preset timeline is met, transmitting uplink control information, which is carried on the PUCCH within the multiple uplink channels, on the target uplink channel;
wherein the processor is further configured for:
performing the following judgement for a channel with an earliest transmission time from the PUCCH within the multiple uplink channels and the target uplink channel:
a first symbol of the channel with the earliest transmission time is not earlier than N1+X symbols after a last symbol of a physical downlink shared channel (PDSCH) corresponding to the PUCCH within the multiple uplink channels; and
the first symbol of the channel with the earliest transmission time is not earlier than N2+Y symbols after a last symbol of a physical downlink control channel (PDCCH) corresponding to the target uplink channel;
wherein N1 is a preset processing delay of PDSCH, N2 is a preset processing delay of PUSCH, and X and Y are preset additional processing delays.

8. The terminal according to claim 7, wherein the processor is further configured for:
when the preset timeline is not met, determining that overlapping of the multiple uplink channels in the time domain is an erroneous scheduling or configuration.

9. The terminal according to claim 7, wherein the processor is further configured for:
selecting one PUSCH from the multiple PUSCHs according to a PUSCH selection rule;
performing preset timeline judgment on the selected one PUSCH and the PUCCH;
wherein the transceiver is further configured for, under the condition that the preset timeline is met, transmitting the uplink control information, which is carried on the PUCCH, on the selected PUSCH.

10. A network device for performing the method according to claim 4, comprising: a transceiver, a memory, a processor and computer programs stored on the memory and operable on the processor;
wherein the processor is configured for reading the programs in the memory and implementing the following processes:
determining one target uplink channel according to a preset rule under the condition that multiple uplink channels are overlapped in time domain; wherein the multiple uplink channels include one physical uplink control channel (PUCCH) and multiple physical uplink control channels (PUSCHs);
performing preset timeline judgement for the PUCCH within the multiple uplink channels and the target uplink channel;
wherein the transceiver is configured for, when the preset timeline is met, receiving uplink control information, which is carried on the PUCCH within the multiple uplink channels, on the target uplink channel;
wherein the processor is further configured for:
performing the following judgement for a channel with an earliest transmission time from the PUCCH within the multiple uplink channels and the target uplink channel:
a first symbol of the channel with the earliest transmission time is not earlier than N1+X symbols after a last symbol of a physical downlink shared channel (PDSCH) corresponding to PUCCH within the multiple uplink channels; and
the first symbol of the channel with the earliest transmission time is not earlier than N2+Y symbols after a last symbol of a physical downlink control channel (PDCCH) corresponding to the target uplink channel;
where N1 is a preset processing delay of PDSCH, N2 is a preset processing delay of PUSCH, and X and Y are preset additional processing delays.

11. The network device according to claim 10, wherein the processor is further configured for:
when the preset timeline is not met, determining that overlapping of multiple uplink channels in the time domain is an erroneous scheduling or configuration.

12. The network device according to claim 10, wherein the processor is further configured for:
selecting one PUSCH from the multiple PUSCHs channel according to a PUSCH selection rule;
performing preset timeline judgment on the selected one PUSCH and the PUCCH;
wherein the transceiver is configured for, under the condition that the preset timeline is met, receiving the uplink control information, which is carried on the PUCCH, on the selected one PUSCH.

* * * * *